US00RE50761E

(19) United States
(12) Reissued Patent
Brunner

(10) Patent Number: US RE50,761 E
(45) Date of Reissued Patent: Jan. 27, 2026

(54) WHEELED CONTAINER HANDLE ASSEMBLY

(71) Applicant: Keter Plastic Ltd., Herzliya (IL)

(72) Inventor: Yaron Brunner, Kibbutz Gvat (IL)

(73) Assignee: Keter Plastic Ltd., Herzliya (IL)

(21) Appl. No.: 18/223,953

(22) Filed: Jul. 19, 2023

Related U.S. Patent Documents

Reissue of:
(64) Patent No.: 11,066,089
Issued: Jul. 20, 2021
Appl. No.: 15/781,649
PCT Filed: Dec. 8, 2016
PCT No.: PCT/IL2016/051312
§ 371 (c)(1),
(2) Date: Jun. 5, 2018
PCT Pub. No.: WO2017/098511
PCT Pub. Date: Jun. 15, 2017

U.S. Applications:
(60) Provisional application No. 62/265,510, filed on Dec. 10, 2015.

(51) Int. Cl.
*B62B 1/00* (2006.01)
*B62B 1/16* (2006.01)
*B62B 5/06* (2006.01)

(52) U.S. Cl.
CPC ..... *B62B 1/008* (2013.01); *B62B 1/16* (2013.01); *B62B 5/067* (2013.01)

(58) Field of Classification Search
CPC ... A45C 5/146; A45C 5/145; A45C 2013/267; B62B 1/008; B62B 5/049
See application file for complete search history.

(56) References Cited

U.S. PATENT DOCUMENTS

| | | | | |
|---|---|---|---|---|
| 4,974,871 | A | 12/1990 | Mao | |
| 5,642,552 | A | 7/1997 | Wang | |
| 5,683,097 | A | 11/1997 | Fenton et al. | |
| 6,559,791 | B1 | 5/2003 | Davidson | |
| 6,575,274 | B1 * | 6/2003 | Huang | A45C 13/262 16/113.1 |
| 6,581,737 | B2 * | 6/2003 | Wang | B27B 29/00 280/655 |
| 6,604,615 | B2 * | 8/2003 | Wu | A45C 5/146 280/37 |
| 6,644,447 | B2 * | 11/2003 | Pohl | A47C 7/0045 190/1 |
| 7,503,569 | B2 | 3/2009 | Duvigneau | |
| 7,938,412 | B2 | 5/2011 | Katz | |

(Continued)

FOREIGN PATENT DOCUMENTS

| | | | |
|---|---|---|---|
| CN | 2198167 | Y | 5/1995 |
| CN | 200971107 | Y | 11/2007 |

(Continued)

OTHER PUBLICATIONS

JP-3851278-B2, Machine Translation, (Year: 2006).*

*Primary Examiner* — Sarah B Mcpartlin
(74) *Attorney, Agent, or Firm* — Mintz Levin Cohn Ferris Glovsky and Popeo, P.C.

(57) ABSTRACT

Provided are wheeled containers having a handle assembly that is configured for providing support to an assembly of containers when in rest position and for permitting locomoting of the assembly upon demand.

24 Claims, 9 Drawing Sheets

(56) References Cited

U.S. PATENT DOCUMENTS

| | | | | |
|---|---|---|---|---|
| 8,820,497 | B1 * | 9/2014 | Goldsmith | A45C 5/14 190/8 |
| 8,919,508 | B1 * | 12/2014 | Halko | A45C 9/00 190/11 |
| 9,277,796 | B1 * | 3/2016 | Elam | A45C 9/00 |
| 2002/0070517 | A1 | 6/2002 | Ramsey | |
| 2007/0145700 | A1 * | 6/2007 | Ambrose | A47C 9/10 280/47.26 |
| 2008/0223679 | A1 | 9/2008 | Wong | |
| 2009/0149279 | A1 | 6/2009 | Fischer et al. | |
| 2009/0160147 | A1 * | 6/2009 | Arthur | B62B 1/22 280/37 |
| 2009/0266833 | A1 | 10/2009 | Savage et al. | |

FOREIGN PATENT DOCUMENTS

| | | | | | |
|---|---|---|---|---|---|
| CN | 201160579 | Y | | 12/2008 | |
| CN | 203637873 | U | | 6/2014 | |
| CN | 204279539 | U | | 4/2015 | |
| CN | 108367768 | B | | 7/2021 | |
| DE | 202018102233 | U1 | * | 6/2018 | |
| EP | 1 724 069 | A2 | | 11/2006 | |
| EP | 1 859 908 | A1 | | 11/2007 | |
| EP | 1859908 | B1 | | 4/2009 | |
| GB | 2278319 | A | | 11/1994 | |
| GB | 2288726 | A | * | 11/1995 | A45C 13/262 |
| JP | 3851278 | B2 | * | 11/2006 | |
| JP | 5098040 | B2 | | 12/2012 | |
| WO | 03/017806 | A1 | | 3/2003 | |

* cited by examiner

WHEELED CONTAINER HANDLE ASSEMBLY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is for a reissue of U.S. Pat. No. 11,066,089, filed on Jun. 5, 2018, which is a national phase application, filed under 35 U.S.C. §371, of PCT International Application No. PCT/IL2016/051312, filed on Dec. 8, 2016, and entitled "Wheeled Container Handle Assembly," which claims priority to U.S. Provisional Application Ser. No. 62/265,510, filed Dec. 10, 2015, and entitled "Wheeled Container Handle Assembly," the disclosures of all of which are incorporated herein by reference in their entireties.*

TECHNOLOGICAL FIELD

The present disclosure is generally in the Field of wheeled containers having a handle assembly. More specifically the disclosure is directed to a wheeled container with a handle that is suitable for use as part of a multi-container assembly.

The term multi-container assembly as used herein denotes any set of containers configured for articulation to one another, the assembly being either stationary or locomotive. Said assembly can be used as a tool cart, workshop, traveling luggage, etc.

The term container as used herein denotes any type of container, used as a tool caddy, organizer, traveler bag, cosmetics bag, storage containers, locomoting containers, etc.

GENERAL DESCRIPTION

According to a first aspect of the present disclosure there is provided a mobile container assembly comprising a container assembly with a wheeled base container configured with at least a rear rolling wheel assembly, and a handle assembly attached to the wheeled container. The handle assembly is configured with a handle that is manipulable between a retracted handle position and an extended handle position, and a tilt support that is manipulable between a retracted position and an extended position, wherein when the tilt support is at the extended position a ground support thereof extends behind and below an axis of the rear rolling wheel assembly.

According to one example of this disclosure, when the tilt support is at the extended position, a ground support thereof extends substantially horizontally aligned with a bottom surface of the rear rolling wheel assembly.

According to another example of this disclosure, when the tilt support is at the extended position, a ground support thereof extends is substantially aligned with a bottom surface of the wheeled basic container.

The wheeled base container is configured to operate in a rest, upright position or alternatively in a mobile position, locomoted by the rolling wheel assembly. At the upright position the base container with the handle assembly articulated thereto are disposed at a substantially vertical position in respect to the floor. At the mobile position, the wheeled base container can be pulled by the handle assembly at a tilted position, rolling over the rear rolling wheel assembly, or if the wheeled base container further comprises a front wheel assembly, the container can be maneuvered by the handle when being at the upright position.

When the wheeled base container is configured with more than a rear rolling wheel assembly, a bottom surface of the wheels is coplanar such that all wheels engage the floor. At such a configuration, the ground support of the tilt support, at its extended tilt position, is disposed such that its bottom surface is also coplanar with the wheels.

When the wheeled container is configured with only a rear rolling wheel assembly, an axle of said wheels is located at or adjacent a bottom portion of a back wall of the base container, and the handle assembly is articulated to a said back wall. In such a configuration, when the container is at the rest position, wheels of the rear rolling wheel assembly are disengaged from the ground and the ground support of the tilt support, when at the extended position, is disposed coplanar with the bottom surface of the container.

The arrangement is such that when the wheeled container is at rest, at the upright position, the tilt support can be activated so as to extract the ground support to its extended position, thereby prevent tilt-over of the wheeled container over the rear wheels. Once the ground support engages the ground, it extends behind the axle of the rear wheels, permitting also a non-balanced container to be supported at its upright position.

According to a second aspect of the present disclosure there is disclosed a handle assembly for a container assembly with a wheeled base container configured with at least a rear rolling wheel assembly; said handle assembly configured for attaching to the wheeled container, wherein the handle assembly is configured with handle that is manipulable between a retracted handle position and an extended handle position, and a tilt support that is manipulable between a retracted position and an extended position, wherein when the tilt support is at the extended position a ground support thereof extends behind and below an axis of the rear rolling wheel assembly.

The handle assembly can be fixed to the wheeled base container or detachably attached thereto.

According to a particular example, the container assembly comprises a cantilever container, having an open position in which a top portion of the cantilever container extends behind a rear axle of the wheeled base container. At the open position of the cantilever container, the handle assembly is manipulated into its retracted handle position and the tilt support is manipulated into its extended position.

In accordance with an example of the disclosure, the handle assembly may comprise a telescopic handle, integrated with the tilt support. The telescopic handle comprises at least one rod configured with a gripping member at an upper portion thereof, with the tilt support at a lower portion of said rod, wherein the telescopic handle is secured to the container assembly via a handle support member, wherein said rod extends and retracts coaxially within said handle support member.

The handle support member can be fixedly or detachably attached to the wheeled container and is configured with a manipulation member; the manipulation member may be configured with a locking mechanism which secures and locks the rod of the telescopic handle at an extended handle position or at a retracted handle position. A bottom end of the rod of the telescopic handle can be configured with the tilt support member, the later configured with a floor engaging member. Said floor engaging member can be configured with anti-skid surfacing.

According to this disclosure, when the telescopic handle assembly is at a fully extended handle position, the tilt support member is respectively in a retracted position and vice versa, when the telescopic handle assembly is at its fully retracted handle position, the tilt support member is respectively in an extended position.

The support member of the handle assembly may comprise a support frame and a manipulation member attached to the wheeled container through two spaced attachment members of the wheeled container, one located near the open upper edge of the wheeled container and a second located near a bottom of the wheeled container. Attachment of said handle assembly support member to the attachment members may be done by soldering, butt welding, butt fusion, using bolts or screws, by sliding catch or any alternative effective attachment method. The support frame may be hollowed to allow coaxial displacement of a telescopic rod therewithin. Alternatively any of the handle, the telescopic handle and the tilt support assemblies may be configured as a stand-alone assemblies, detachable from the wheeled container.

The locking mechanism of the manipulation member may comprise at least one locking member associated with the respective telescopic handle rod and a locking bolt member configured to engage the locking member. The looking member is configured to facilitate axial displacement of the telescopic handle rod with respect to the support frame of the support member in an extraction direction, whilst retraction (i.e. in an opposite direction) can be facilitated only upon unlocking the locking mechanism.

Any one or more of the following features, designs and configurations, can be implemented in a container handle assembly, according to the present disclosure, individually or in various combinations thereof:

The locking mechanism can be a ratchet type locking mechanism;

The locking mechanism can be an eccentric/cam type lock;

The locking mechanism can be configured with a biasing mechanism for retaining the locking mechanism at a normally locked position;

The biasing mechanism is integrally formed with at least a portion of the locking mechanism;

The biasing mechanism is a biasing spring configured contract and biased to expand;

The locking mechanism can comprise a lever (or bolt) associated with a locking member provided over both telescopic rods and wherein said rod is a telescopic rod having a locking mechanism actuatable by a common manipulating member;

The wheeled container can be designed in different modifications. According to one particular design, the container is in the form of an open container or basket or bucket, part of a modular system, with an open top closable by additional modular elements, wherein said modular elements adapted for interconnecting are provided such that a user may assemble an array of compartments and containers, on top the wheeled container.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

Figure 1A:
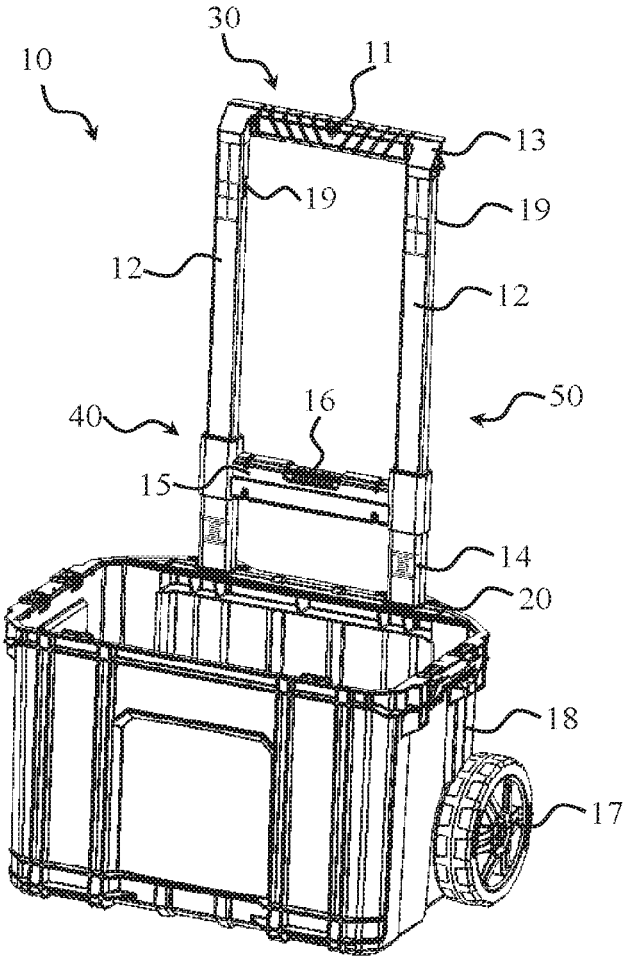
FIG. 1A is a front perspective view of a mobile container assembly with a handle assembly according to an embodiment of the present disclosure, showing the handle at an extended handle position and tilt support at a retracted position.
Figure 1B:
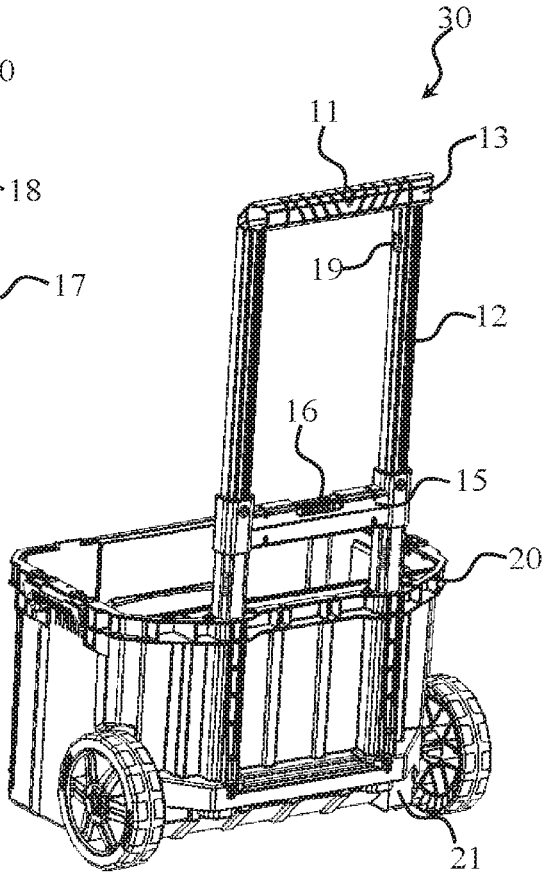
FIG. 1B is a rear side perspective view of the mobile container with a handle assembly of FIG. 1A.
Figure 2A:
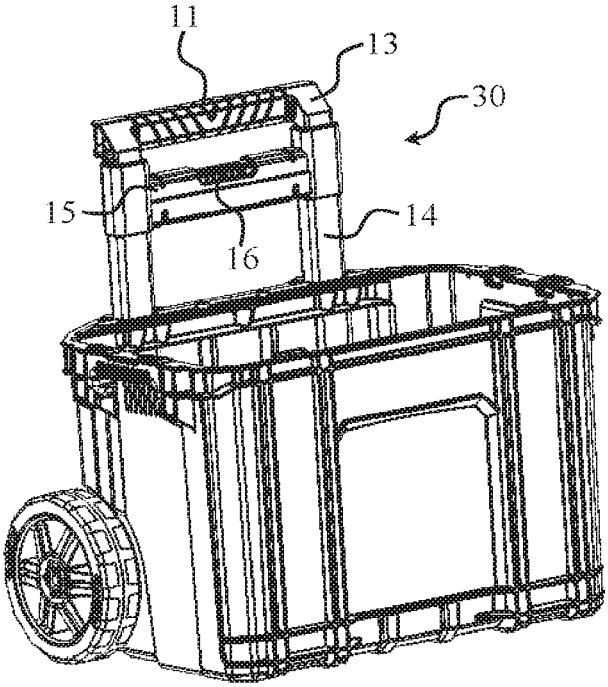
FIG. 2A is a front perspective view of a mobile container assembly with a handle assembly according to an embodiment of the present disclosure, showing the handle at a retracted handle position and tilt support at an extended position.
Figure 2B:
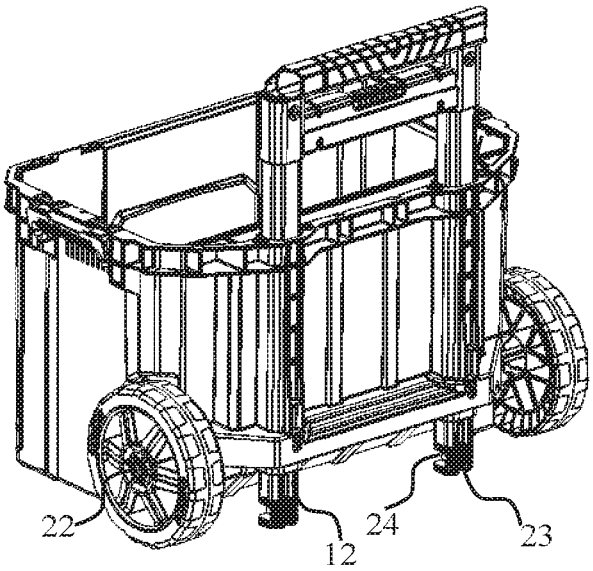
FIG. 2B is a rear side perspective View of the mobile container with a handle assembly of FIG. 2A.
Figure 7A:
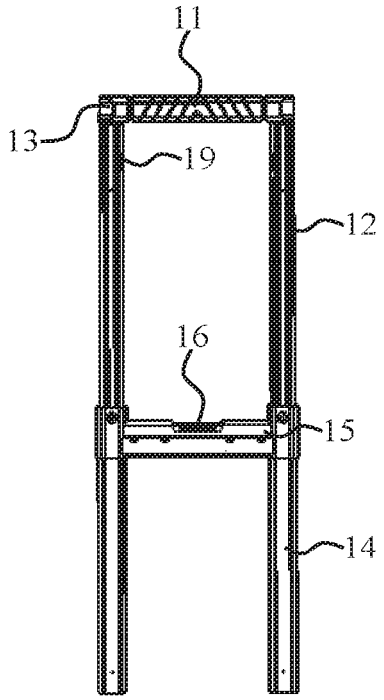
FIG. 7A is a front view of the handle assembly showing the handle at a fully extended handle position and the tilt support at a fully retracted position.
Figure 7B:
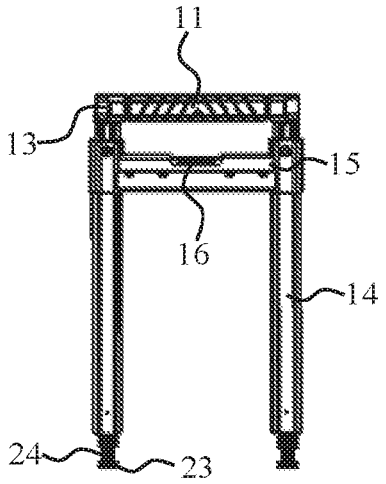
FIG. 7B is a front view of the handle assembly of FIG. 7A showing the handle at a fully handle retracted position and the tilt support at a fully extended position.

Attention is directed to drawings illustrating a mobile container assembly with a handle assembly, according to the present disclosure, generally designated 10. The mobile container assembly comprises a container assembly with a wheeled base container configured with at least a rear rolling wheel assembly and a handle assembly 30 (shown in isolation in FIGS. 7A and 7B) configured with a telescopic handle member 50. The telescopic handle member comprises a pair of parallel rods 12 and a tilt support member 23 located at the lower portion of each of the rods 12. The rods 12 are interconnected perpendicularly at their upper portion through a gripping member 11, wherein each rod 12 is attached to the gripping member 11 through an attachment frame 13; and a H-like shaped support member 40, which is attached to a wheeled base container 18. The H-like shaped support member 40 enables said pair of rods 12 to extend coaxially within a pair of support frames 14, allowing the pair of parallel rods 12 to displace relatively to the pair of support frames 14, between a fully extended handle position (as best seen in FIGS. 1A and 2A) and a fully retracted handle position (as shown in FIGS. 1B and 2B).

The gripping member 11 may be covered by a sleeve in order to improve grip of the handle. The sleeve may, for example, be made of rubber, wood, plastic or any other grip-improving material. Attachment frames 13 are located on both ends of the gripping member 11, securing the rods 12 perpendicularly to the gripping handle 11 and parallel one to another; the space between the two telescopic rods is defined by the length of the gripping member 11. The tilt support member 23 (seen in FIG. 2B) is located at the lower portion of the rod 12 and may be configured with floor engaging members for ground support. The floor engaging members may be fitted with anti-skid surfacing or any other suitable material. Each telescopic rod 12 is configured with a pair of locking slots 19 and 24, one (19) located at the upper portion of the rod, adjacent to the gripping member 11, and a second one (24) located adjacent to the tilt support member 23 at the lower portion of the rod. The upper slot 19 is configured to engage with an arresting bolt 25 of a locking mechanism configured within lever 16 (as seen in FIGS. 4A-4B) securing the telescopic handle 30 at a retracted handle position and the tilt support at an extended position; the lower slot 24 is configured to engage the arresting bolt 25 of the locking mechanism securing the telescopic handle 30 at an extended handle position and the tilt support at a retracted position.

Figure 3B:
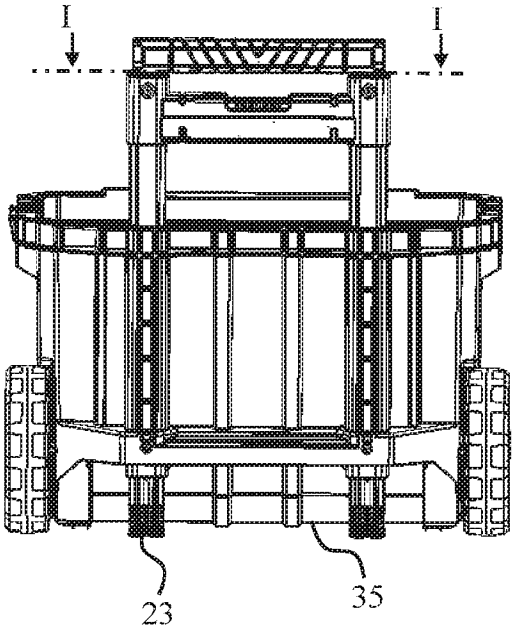
FIG. 3B is a rear view of the mobile container with a handle assembly of FIG. 3A, showing the handle at a retracted handle position and the tilt support at an extended position.
Figure 3A:
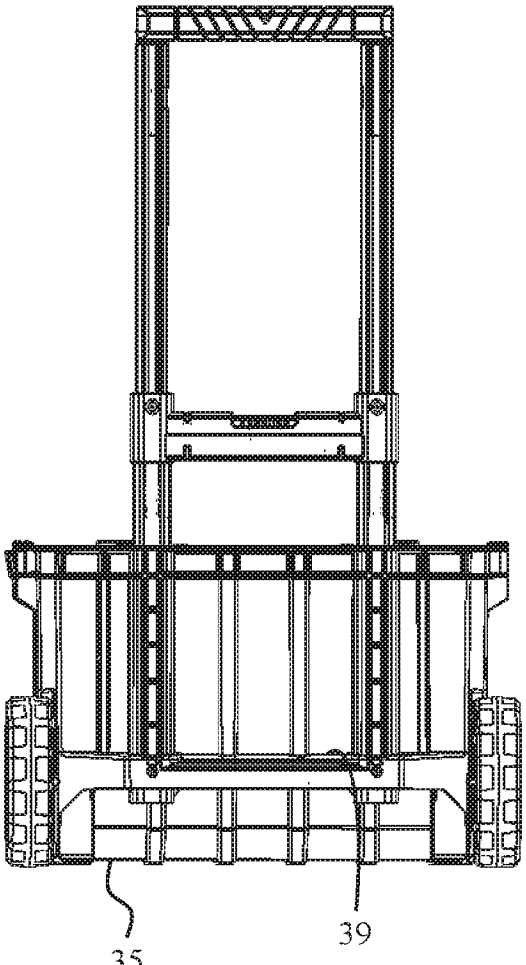
FIG. 3A is a rear view of the mobile container with a handle assembly according to an embodiment of the present disclosure, showing the handle at an extended handle position and the tilt support at a retracted position.
Figure 5B:
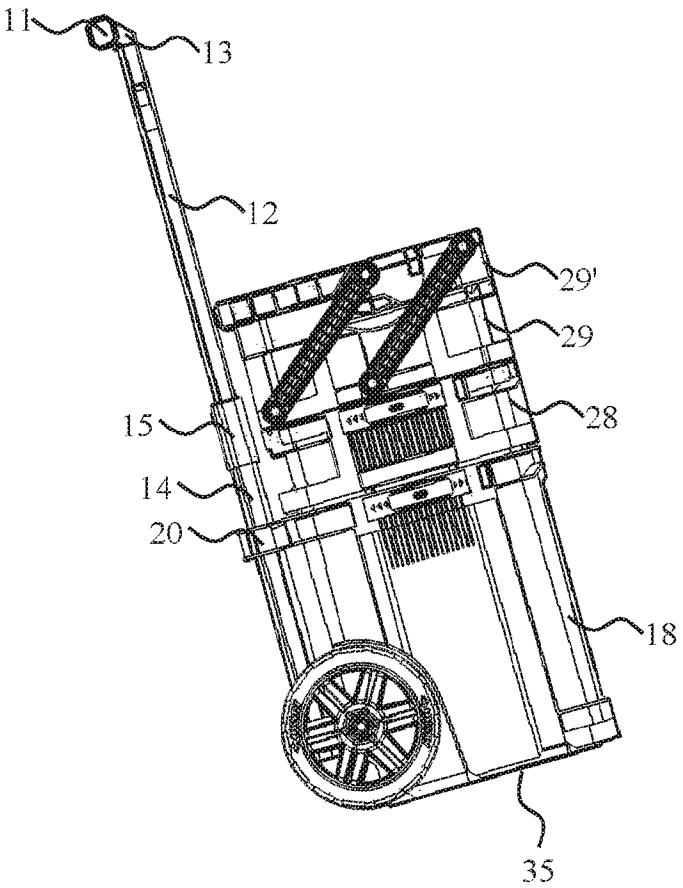
FIG. 5B is a side view of the embodiment of FIG. 5A in a "tilted" (travel) position.
Figure 5A:
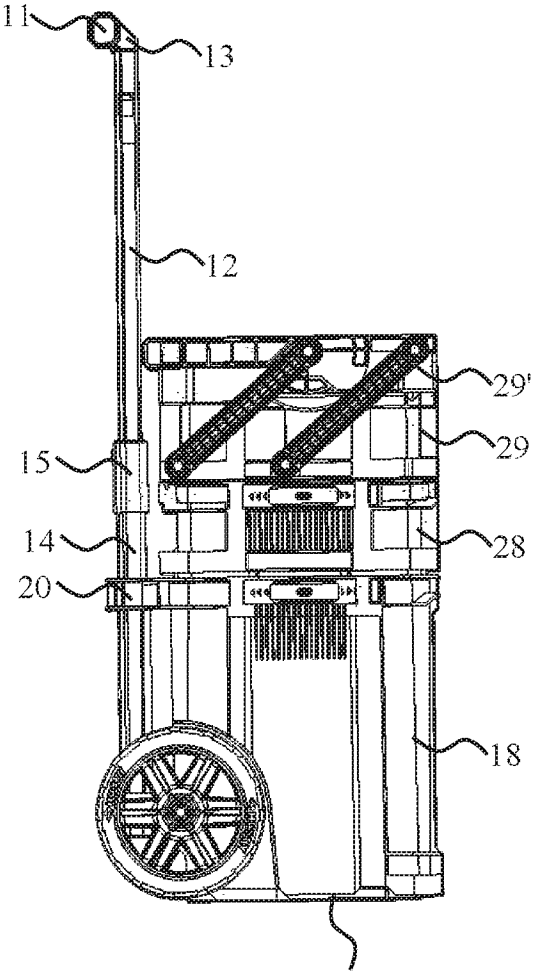
FIG. 5A is a side view of the mobile container assembly according to another embodiment of this disclosure at a "rest" position and with the handle fully extended and the tilt support fully retracted.
Figure 5D:
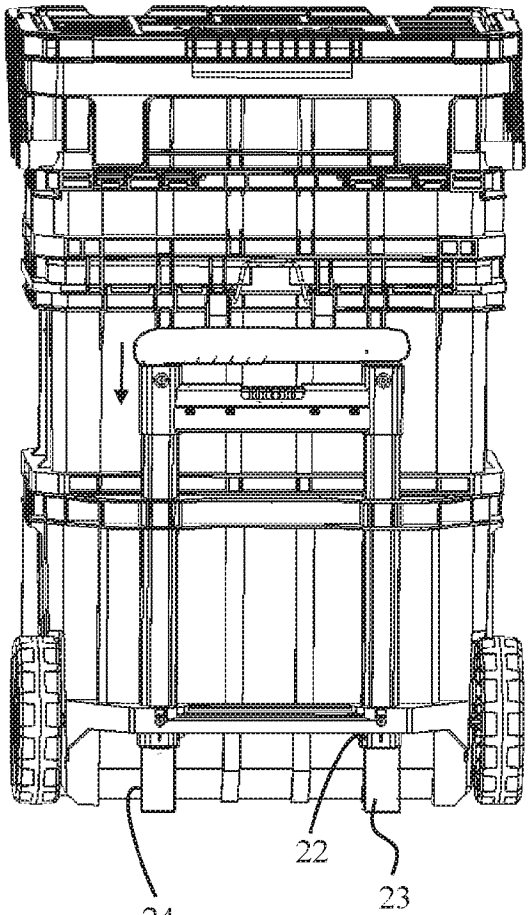
FIG. 5D is a back view of the embodiment of FIG. 5C, showing the handle at a fully retracted handle position and the tilt support in a fully extended position.
Figure 5C:
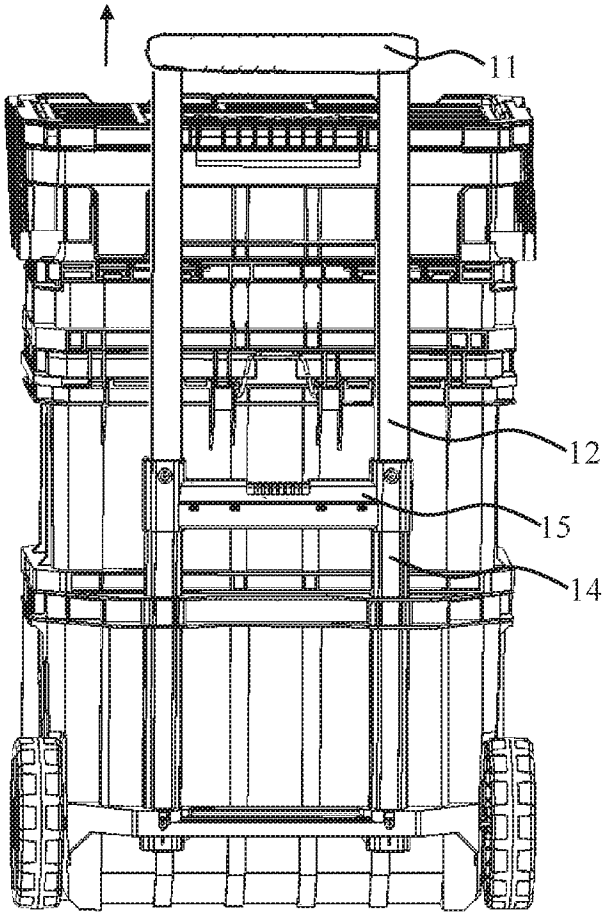
FIG. 5C is a back view of another embodiment of the mobile container assembly, showing the handle at a fully extended handle position and the tilt support fully retracted.
Figure 6A:
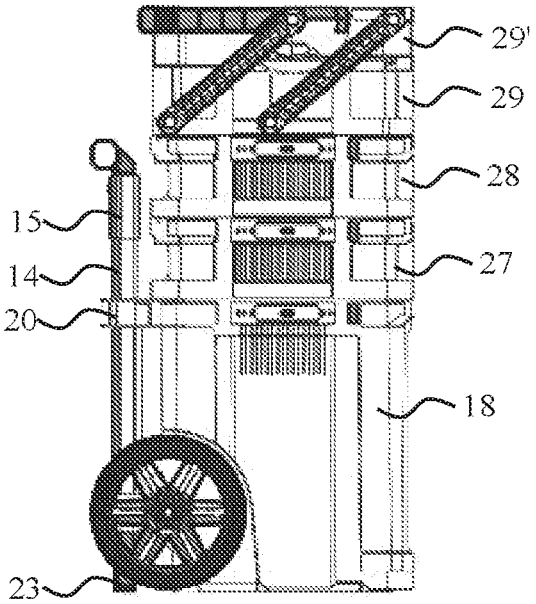
FIG. 6A is a side view of an alternative embodiment of this disclosure at a "rest" position and with handle at a fully retracted handle position and the tilt support at a fully extended position.
Figure 6B:
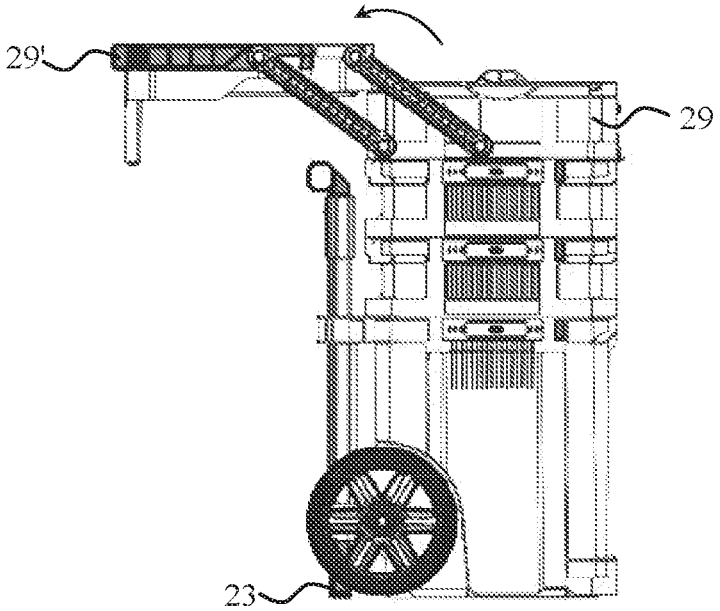
FIG. 6B is a side view of the embodiment of FIG. 6A, showing a top container at an open position.

When the telescopic handle 30 is at its retracted handle position and the tilt support is at a fully extended position, the tilt support extends behind and bellow an axis of the rear rolling wheels assembly, wherein the bottom surface of the tilt support members 23 is aligned on a horizontal plane defined by the bottom surface of the wheeled container 35 as shown of FIGS. 3B, 5D and 6B, providing additional ground support. It is further noticed that the handle assembly may be fixed and not telescopic. In such embodiments, the tilt support member may be manipulated using the same elements or similar elements described herein, and configured to deploy into a fully extended or retracted position through a manipulation member similar to the described herein. Further, the handle assembly may be manufactured as a modular part, attachable modularly to a mobile container by means of bolts, straps, screws, soldering, butt fusion or any alternative effective method.

As noted above, the H-like shaped support member 40 comprises a pair of parallel support frames 14 perpendicularly interconnected through a manipulation member 15 having a locking mechanism configured within lever 16 which secures and locks the rods 12 at the handle's fully extended handle position or at its fully retracted handle position. The H-like shaped support member 40 is attached to a wheeled base container 18 through two spaced attachment members 20,21; member 20 is located near the upper edge of the container assembly 18 and the second member 21 is located near the bottom of the container assembly 18. The attachment of the H-like shaped support member 14 to the attachment members 20 and 21 may be by a variety of methods and tools: soldering, butt welding, butt fusion, using bolts or screws, sliding catches or any alternative effective attachment method.

Figure 4A:
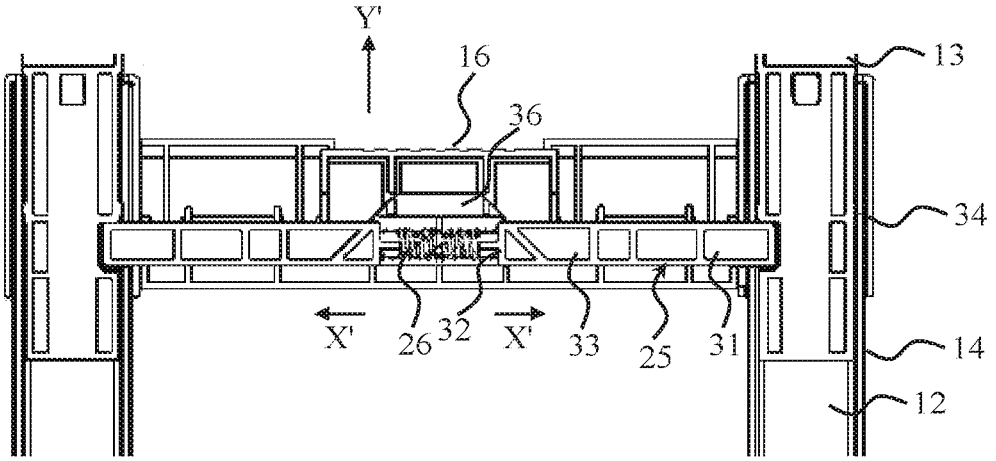
FIG. 4A is a section taken along line I-I in FIG. 3B showing the locking mechanism on its "locked" position.
Figure 4B:
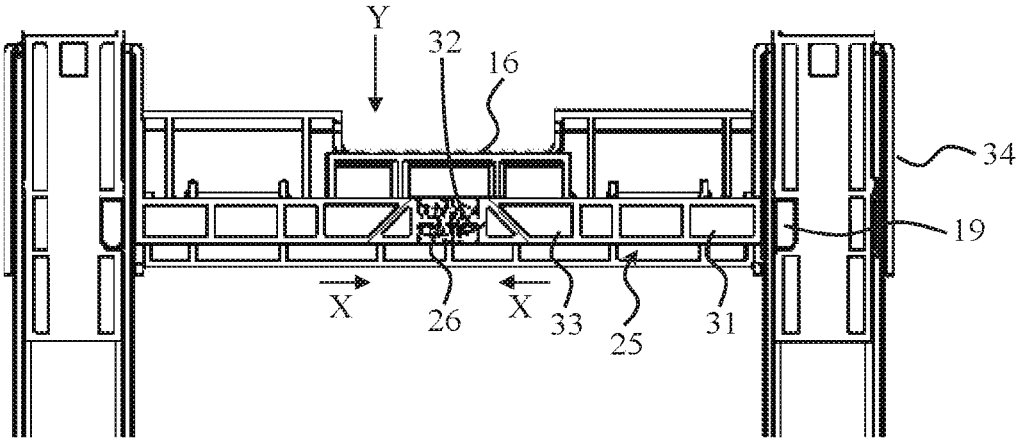
FIG. 4B is a section taken along line I-I in FIG. 3B showing the locking mechanism on its "unlocked" position.

The manipulation member 15 is shown in details in FIGS. 4A and 4B, and includes a locking mechanism that is configured within lever 16 and a pair of attachment members 34, located at both end portions of the manipulation member 15. The attachment members 34 are attached to the parallel support frames 14 securing them in parallel one with respect to the other and perpendicular to the manipulation member 15, forming the H-like shaped support member 40, which supports the rods 12 of the telescopic handle 50.

The locking mechanism comprising a pair of arresting bolts 25 configured to engage the locking slots 19 and 24 of the rods 12 of the telescopic handle 50, a release lever 36 and a biasing arrangement 26. The arresting bolts 25 are configured to extend coaxially within the manipulation member 15 and connected to each other through a biasing arrangement 26. The arresting bolts 25 are configured for axial displacement along directions X and X' as shown in FIGS. 4A and 4B.

The locking mechanism may be configured in a variety of different configurations and types, for example, a ratchet type locking mechanism, an eccentric/cam type lock, etc.

The locking mechanism may by fitted with a biasing arrangement for retaining the locking mechanism at a normally locked (extended or retracted) position, such as biasing spring 26. Biasing spring 26 is configured for biasing the bolts 25 into their locked position (as seen in FIGS. 4A and 4B) and is held in a contracted state by attachment members 34 when the handle is in a transient position between retraction and extension.

Although in the present disclosed subject matter the biasing member 26 is in the form of a spring, extending between the inner edges 32 of the arresting bolt members 25, thereby interconnecting these, it will be appreciated that other types of biasing members are envisioned, e.g. accordion-like strip, configured to contract and biased to expand, which can be integrally formed, injection molded along with the arresting bolts 25. Such arrangement can reduce assembly costs and prevent rust corrosion which might develop using other types of biasing members made of metal.

The arresting bolts 25 have a locking extreme end 31 that is configured to be latched within an inner portion of the locking slots 19 and 24. The locking may alternatively be a ratchet tooth-like edge. The arresting bolts' 25 inner portion is configured to engage the biasing arrangement 26 and a protrusion with a slanted wall 33 configured to engage with the lever 16.

In the present example the release lever 16 is located at the center of the manipulation member 15 and is provided with downwardly slanted extensions 36 configured to engage the arresting bolts inner portion slanted wall 33. The manipulation member 15 is associated with the release lever [36]*16* to actuate the locking mechanism [16] and release the arresting bolts 25 from the respective locking slot (19 or 24). The engagement between the slanted release lever extension and the arresting bolts' protrusion with a slanted wall 33 is such that manipulating the release lever [36] *16* by pressing in the direction of axis Y in FIG. 4B, the extension is configured to slide downwardly, pulling the arresting bolts 25 in the direction of the arrow X in FIG. 4B. When pressing the release lever 16, both arresting bolts 25 are simultaneously manipulated to move inwards, pressing the biasing arrangement 26 and unlocking the engagement to locking slots 19 or 24. Once the release lever 16 is released (moving upwards in the direction of arrow Y' in FIG. 4A) the arresting bolt members are biased to extend in opposite directions (marked by arrows X' in FIG. 4A) until engaging the respective upper locking slot 19 if the telescopic handle 10 is pulled downwardly towards its retracted handle position, or engaging the lower locking slot 24 once the telescopic handle is pushed upwardly towards its extended handle position.

Retraction or extension of the telescopic handle is facilitated upon manipulating and unlocking the respective locking mechanism. It is appreciated that the telescopic handle 50 is prevented from spontaneous retraction, e.g. when pressed down once released from its fully extended position, owing to friction forces residing between the telescopic handle rods 12 and the inner walls of the support frames 14 of the H-like shaped support member 40.

The container assembly 10 may be designed to have different configurations. The container assembly may be in the form of a basket or cabinet, part of a modular system, with an open top closable by additional modular elements 27, 28, 29 and 29' as shown in FIGS. 5A, 5B, 5C, 5D, 6A and 6B. The various modular elements are adapted for interconnecting one with the other, such that a user may assemble an array of stackable compartments and containers on top of the wheeled base container 18. The bottom surface 35 of the wheeled base container 18 may be configured with reinforcement bars and support members.

The wheeled based container 18 typically comprises at least one pair of rear rolling wheels 17 for locomoting the assembly at tilted a position of the assembly. When the container assembly 10 is at an upright, rest position, the container assembly rests at a horizontal plane formed by the bottom wall of the wheeled base container 35, the bottom of the wheels 17 and the bottom of the tilt support members 23 of the telescopic handle 50, wherein the telescopic handle is locked at its retracted handle position and the tilt support is locked at its extended position. At a tilted position, and with the telescopic handle 50 at a fully extended position and the tilt support at a fully retracted position, as shown in FIG. 5B, the assembly 10 rests on the bottom of the wheels 17, facilitating movement of the whole mobile container assembly.

For easy displacement of the mobile container assembly into its tilted mobile position, there is formed, typically adjacent the bottom of the wheeled base container, a footstep portion 39 for an individual to step on when tilting the assembly, which may be integral with the lower attachment member 21. In the presently provided examples, the attachment member 21 has the built-in, integral, footstep 39 which also provides a supporting channel for the positioning of the rear rolling wheels central axis 22 therewithin.

Figure 8A:
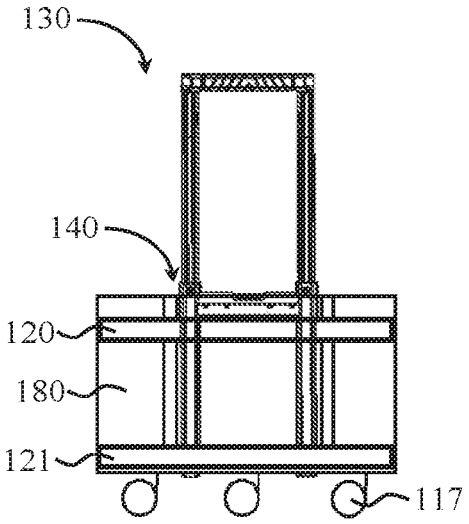
FIG. 8A is a rear view of an alternative embodiment of the mobile container assembly of this disclosure, showing a mobile container with a handle assembly at a fully extended handle position and a tilt support at a fully retracted position.
Figure 8B:
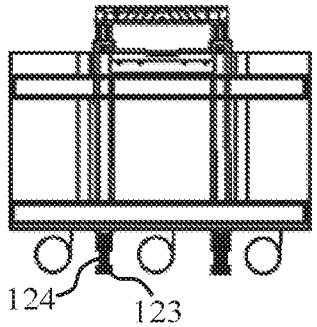
FIG. 8B is a rear view of the embodiment of FIG. 8A showing the handle at a fully retracted handle position and the tilt support at a fully extended position.

As can further be seen in FIGS. 8A and 8B, another embodiment is shown, in which the handle assembly 130 may be installed in a variety of mobile containers, with more than a single pair of wheels 117, being configured similarly to previous embodiments. The handle assembly 130 of this example is configured with a telescopic handle 150 and a tilt support 123, an H-like shaped support frame 140 attached to a wheeled container 180 through two attachment members 120 and 121. Similarly to the previous embodiments, when the telescopic handle is at a fully retracted handle position and the tilt support member at a fully extended position (FIG. 8B), ground support is provided through floor engaging elements. Differently from previous embodiments, the assembly of this example is not required to be tilted in order to facilitate movement, but rather the whole mobile container assembly can be easily pushed or pulled by displacing the telescopic handle 150 to a fully extended handle position and the tilt support to a fully retracted position (FIG. 8A) without need to bring the assembly to a tilted position. In such configurations, the mobile container assembly is kept at an upright position, perpendicular to a plane defined by the alignment of the bottom surface of the wheels. The mobile container assembly is at a rest position wherein the tilt support member is fully extended (meaning the telescopic handle is fully retracted) and its bottom surface aligns with the bottom surface of the wheels. In order to transfer into a mobile position, the user brings the telescopic handle into a fully extended handle position, bringing the tilt support member upwards into a fully retracted position. In that position the mobile container assembly is freely pushed or pulled through the gripping member.

Figure 9B:
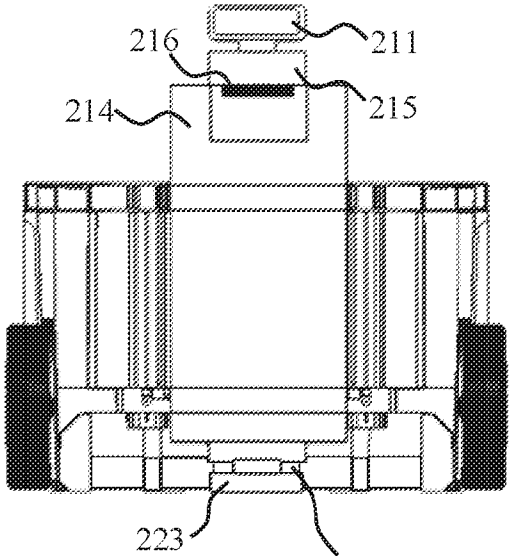
FIG. 9B is a rear view of the embodiment of FIG. 9A showing the handle assembly with the handle at a fully retracted handle position and the tilt support at a fully extended position.
Figure 9A:
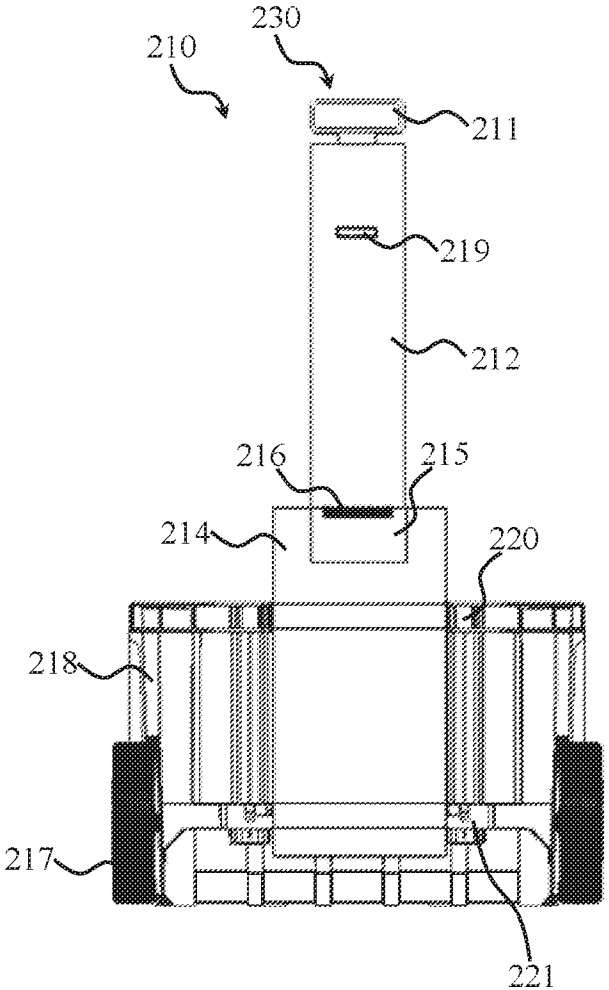
FIG. 9A is a rear view of an alternative embodiment of the mobile container assembly of this disclosure, showing a handle assembly comprising a single telescopic rod, with the handle at a fully extended handle position and the tilt support at a fully retracted position.

In another embodiment, shown in FIGS. 9A and 9B, the wheeled base container 218 having a handle assembly 230 may be configured with a single telescopic handle rod 212, and a corresponding support member 240 comprising a support frame 214 enabling the telescopic handle rod 212 to extend and retract coaxially therewithin and a manipulation member 215 comprising a lever 216. The support member 240 is attached to the wheeled base container through two attachment members, 220 and 221, located respectively adjacent to the upper edge and adjacent to the lower edge of the wheeled base container 218. The single telescopic handle rod 212 is configured with a handle member 211 at its upper portion, and with a tilt support member 223 at its lower portion, and two locking slots 219 and 224 are configured to engage with the locking mechanism to secure and lock the telescopic handle at an extended position (FIG. 9A) or at a retracted position (FIG. 9B), and respectively the tilt support member at a retracted (FIG. 9A) or an extended position (FIG. 9B).

Whilst some embodiments have been described and illustrated with reference to some drawings, the artisan will appreciate that many variations are possible which do not depart from the general scope of the invention, mutatis mutandis.

For example, the wheeled base container may be designed in different shapes and modules and may comprise any combination of drawers, bins, shelves and additional compartments (rigid or flexible).

The invention claimed is:

1. A mobile container assembly comprising a container assembly with a wheeled base container configured with at least a rear rolling wheel assembly, and a handle assembly attached to the wheeled *base* container;

the handle assembly being configured with a *telescopic* handle that is manipulable between a retracted handle position and extended handle position, [and] *the tele-*

*scopic handle comprising a pair of parallel rods, connected to one another at an upper portion thereof by a handle gripping member, each integrated with* a tilt support [that is] *at its lower portion, the tilt support being* manipulable between a retracted position and an extended position, wherein when the tilt support is at the extended position, a ground support thereof extends behind and below an axis of the rear rolling wheel assembly, the telescopic handle [being integrated with the tilt support and comprising at least one rod being configured with a handle gripping member at an upper portion thereof and with the tilt support at a lower portion of said rod, the telescopic handle] being secured to the container assembly via a *H-shaped* handle support member, such that [said rod extends] *the rods extend* and [retracts] *retract* coaxially within [said] *the H-shaped* handle support member, *the H-shaped handle support member being configured with a manipulation member that comprises a locking mechanism configured to secure and lock the rods of the telescopic handle at an extended handle position or at a retracted handle position, and each of the rods comprises a first arresting slot at the upper portion of the rod and a second arresting slot located adjacent to the tilt support at a lower portion of the rod, and the locking mechanism comprises a pair of bolts, the bolts are commonly actuatable by a release lever in which each bolt of the pair of bolts is associated with a respective first arresting slot when the telescopic handle is in the retracted handle position and each bolt of the pair of bolts is associated with a respective second arresting slot when the telescopic handle in the extended handle position.*

2. The mobile container assembly of claim 1, wherein when the tilt support is at the extended position, the ground support extends substantially horizontally and is aligned with a bottom surface of the rear rolling wheel assembly.

3. The mobile container assembly of claim 1, having an operative rest, upright position and a mobile position in which it is locomoted by the rolling wheel assembly.

4. The mobile container assembly of claim 3, wherein when at the upright position, the base container and the handle assembly articulated thereto are disposed at a substantially vertical position; and when at the mobile position, the wheeled base container is configured for pulling by the handle assembly at a tilted position, rolling over the rear rolling wheel assembly.

5. The mobile container assembly of claim 1, wherein the rear rolling wheel assembly comprises an axel associating the wheels, the axel being located at or adjacent a bottom portion of a back wall of the base container.

6. The mobile container assembly of claim 5, wherein the handle assembly is articulated to [a] said back wall.

7. The mobile container assembly of claim 5, wherein when the container is at the rest position, the wheels of the rear rolling wheel assembly are disengaged from the ground and the ground support of the tilt support, when at the extended position, is disposed coplanar with the bottom surface of the container.

8. The mobile container assembly of claim 7, wherein at the rest, upright position of the container[.], the tilt support is activatable for extending the ground support to its extended position for preventing tilt-over of the wheeled container.

9. The mobile container assembly of claim 1, further comprising an additional rolling wheel assembly.

10. The mobile container assembly of claim 1, further comprising a cantilever container, having an open position in which a top portion of the cantilever container extends behind a rear axle of the wheeled base container; when at the open position of the cantilever container, the handle assembly being manipulated into its retracted handle position and the tilt support is manipulated into its extended position.

11. A handle assembly for a container assembly with a wheeled base container configured with at least a rear rolling wheel assembly; [said] *the* handle assembly configured for attaching to the wheeled *base* container, wherein the handle assembly is configured with a *telescopic* handle that is manipulable between a retracted handle position and an extended handle position, and a [lilt] *tilt* support that is manipulable between a retracted position and an extended position, wherein when the [lilt] *tilt* support is at the extended position, a ground support thereof extends behind and below an axis of the rear [roiling] *rolling* wheel assembly, the telescopic handle being integrated with the tilt support and comprising at least one rod being configured with a handle gripping member at an upper portion thereof and with the tilt support at a lower portion of [said] *the at least one* rod, the telescopic handle being configured to be secured to the container assembly Via a handle support member, such that [said] *the at least one* rod extends and retracts coaxially within said handle support member,

*the handle support member being configured with a manipulation member, the manipulation member being configured with a locking mechanism to secure and lock the at least one rod of the telescopic handle at the extended handle position and at the retracted handle position; and*

*wherein the lower portion of the at least one rod comprises an arresting slot located directly adjacent to the tilt support, and wherein the locking mechanism is configured to engage the arresting slot when the tilt support is in the retracted position.*

12. The handle assembly of claim 11, [being] *wherein the handle assembly is* fixed to the wheeled base container or detachably attached thereto.

[13. The handle assembly of claim 1, wherein the telescopic handle being secured to the container assembly via a handle support member, said rod extends and retracts coaxially within said handle support member.]

[14. The handle assembly of claim 1, wherein the handle support member being configured with a manipulation member; the manipulation member being optionally configured with a locking mechanism to secure and lock the rod of the telescopic handle at an extended handle position or at a retracted handle position.]

15. The [handle] *mobile container* assembly of claim 1, wherein the *H-shaped* handle support member comprises a support frame, the support frame being hollowed to allow coaxial displacement of [a telescopic rod] *the rods* therewithin.

16. The mobile container *assembly* of claim 1, wherein the [telescopic handle comprises a] locking mechanism *is configured* for securing the telescopic handle at a retracted handle position and the tilt support at an extended position and/or securing the telescopic handle at an extended handle position and the tilt support at a retracted position.

17. The handle assembly of claim 11, wherein the [telescopic handle comprises a] locking mechanism *is configured* for securing the telescopic handle at a retracted handle position and the tilt support at an extended position and/or securing the telescopic handle at an extended handle position and the tilt support at a retracted position.

[18. The handle assembly of claim 11, wherein the telescopic handle being securable to a container assembly via a handle support member, said rod extends and retracts coaxially within said handle support member.]

[19. The handle assembly of claim 11, wherein the handle support member being configured with a manipulation member; the manipulation member being configured with a locking mechanism to secure and lock the rod of the telescopic handle at an extended handle position or at a retracted handle position.]

20. The handle assembly of claim 11, wherein the handle support member comprises a support frame, the support frame being hollowed to allow coaxial displacement of [a telescopic] *the at least one* rod therewithin.

*21. The mobile container assembly of claim 1, wherein the locking mechanism comprises a biasing arrangement connecting the bolts coaxially within the manipulation member, and configured to retain the bolts at a normally engaged position with the arresting slots.*

*22. The mobile container assembly of claim 21, wherein the biasing arrangement comprises a biasing spring.*

*23. The mobile container assembly of claim 1, wherein the locking mechanism is configured to facilitate axial displacement of the telescopic handle relative to a support frame of the H-shaped handle support member in an extraction direction, while retraction of the telescopic handle in an opposing direction is facilitated only upon unlocking the locking mechanism.*

*24. The mobile container assembly of claim 1, wherein an inner portion of each bolt is configured to engage a protrusion with a slanted wall, the slanted wall configured to engage the lever.*

*25. The handle assembly of claim 11, wherein the locking mechanism comprises a pair of bolts and a biasing arrangement connecting the pair of bolts coaxially within the manipulation member, configured to retain the pair of bolts at a normally engaged position.*

*26. The handle assembly of claim 25, wherein the biasing arrangement comprises a biasing spring.*

*27. The handle assembly of claim 11, wherein the locking mechanism comprises a locking member configured to facilitate axial displacement of the telescopic handle relative to a support frame of the support member in an extraction direction, while retraction of the telescopic handle in an opposing direction is facilitated only upon unlocking the locking mechanism.*

*28. The handle assembly of claim 1, wherein an inner portion of each bolt is configured to engage a protrusion with a slanted wall, the slanted wall configured to engage the release lever.*

* * * * *